UNITED STATES PATENT OFFICE.

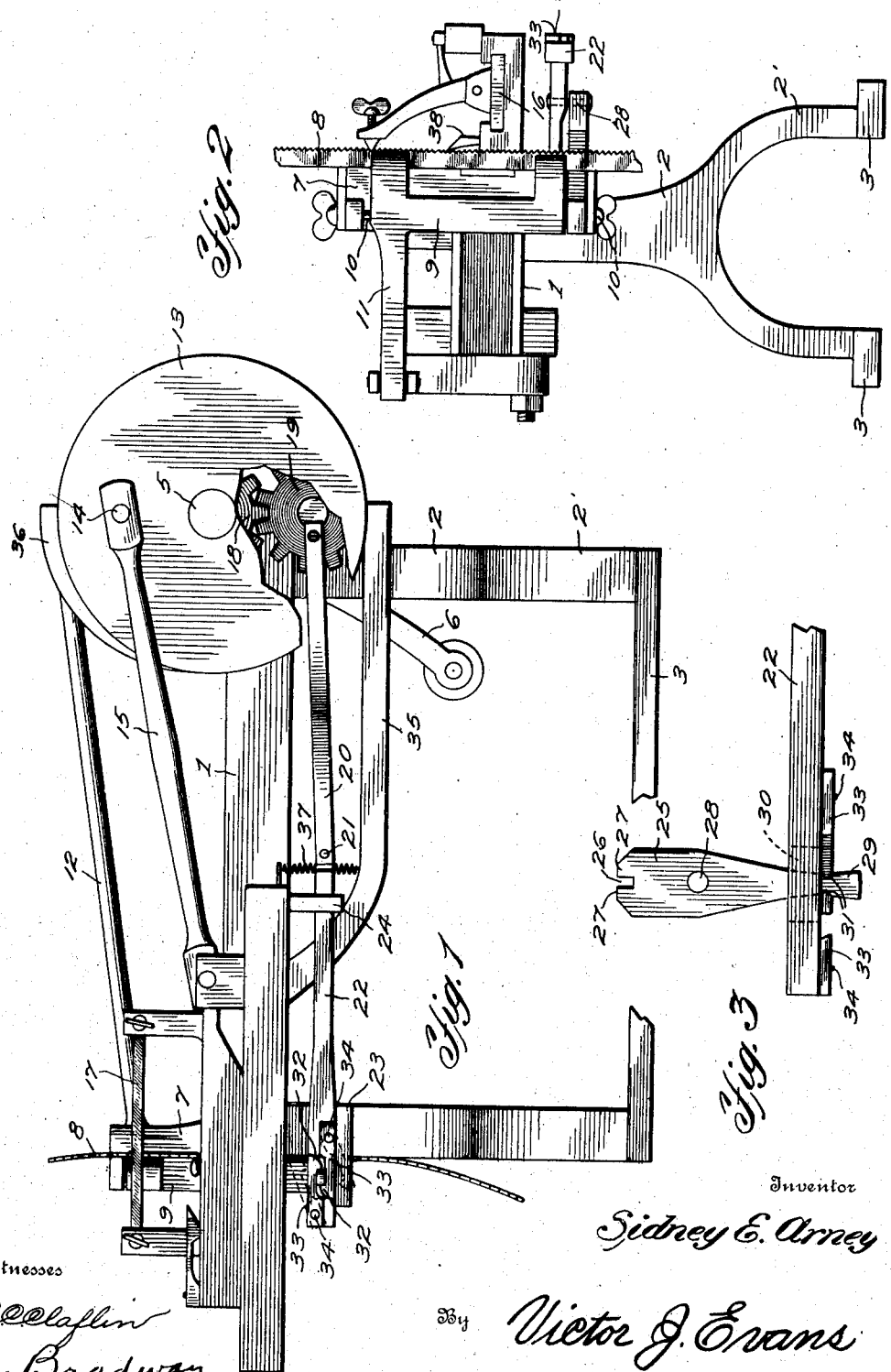

SIDNEY E. ARNEY, OF ROSWELL, TERRITORY OF NEW MEXICO.

SAW-SETTING MACHINE.

No. 865,325.            Specification of Letters Patent.          Patented Sept. 3, 1907.

Original application filed January 26, 1907, Serial No. 354,323. Divided and this application filed May 21, 1907. Serial No. 374,894.

*To all whom it may concern:*

Be it known that I, SIDNEY E. ARNEY, a citizen of the United States, residing at Roswell, in the county of Chaves and Territory of New Mexico, have invented new and useful Improvements in Saw-Setting Machines, of which the following is a specification.

This application is a division of application for Letters Patent Serial No. 354,323, filed Jan. 26, 1907, for which division is made under the requirement of the U. S. Patent Office.

The present invention relates to an automatic saw setting machine of that type in which the teeth are alternately set in opposite directions as the blade is fed through the machine, and the invention is adapted for use in connection with a saw filing machine or separately, as desired.

The invention has for one of its objects to improve and simplify the construction and operation of machines of this character so as to be comparatively easy and inexpensive to manufacture, and reliable and efficient in use.

A further object of the invention is the provision of an oscillating tooth setter for setting alternate teeth in opposite directions and which is actuated by a longitudinally movable member carrying dogs for engaging the tooth setter, there being means for feeding the saw blade with respect to the setter.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a side elevation of a saw setting machine combined with a saw filer. Fig. 2 is an end view thereof. Fig. 3 is a plan view of the saw setter and a portion of the operating mechanism therefor.

The machine in its general construction embodies a bed 1 supported at a suitable elevation by legs 2 and having a bottom brace 3 between corresponding feet 2′ to give additional stiffness to the frame.

At one end, the bed plate is provided with bearings (not shown) in which is journaled the main driving shaft 5, one end of which is provided with an operating crank 6 by means of which motion can be imparted to the various mechanism of the machine by hand. It will, of course, be understood that power may be applied to the main shaft 5 in any other suitable way.

At the end of the bed 1 opposite from the shaft 5 is a vertically extending rest 7 against which the saw blade 8 is held in a vertical position. A periodically oscillated clamping jaw 9 is arranged in coöperative relation with the rest so as to hold the saw blade in position and permit it to be fed step by step as the teeth are successively filed and set. The clamping jaw is fulcrumed on vertically disposed screws 10 on the rest, and extending laterally is an arm 11 to which is pivotally connected one end of a connecting rod 12 which latter receives a longitudinal movement from the driving shaft 5 through an appropriate mechanism so as to rock the clamping jaw.

On the main driving shaft 5 is secured a crank wheel 13 in the form of a disk and to the wrist pin 14 is pivotally connected a pitman 15 for reciprocating the horizontally movable carriage designated generally by 16, the said carriage being provided with means for holding a file 17. Also mounted on the shaft 5 is a gear 18 that meshes with a gear 19 to which is connected a pitman 20. One end of the pitman 20 is hingedly connected at 21 with a longitudinally movable member 22 that rests at one end on a bracket 23 and in a bearing 24 at the opposite end.

Pivotally mounted on the top side of the bracket 23 is a saw setter 25 that has a vertical slot 26 at its inner end for receiving the saw, the shoulders or jaws 27 formed by the slot being adapted to engage the teeth of the blade 8 for setting them alternately in opposite directions. The pivot 28 of the saw setter is located intermediate the ends of the latter and the outer end passes through a slot 30 in the member 22. As shown in Fig. 3, the saw setter 25 is provided with notches 31 on opposite sides with which the shoulders 32 of the oppositely disposed dogs 33 engage. The dogs are arranged in overlapping relation, and disposed on opposite sides of the projecting outer end of the saw setter 25, as clearly shown in Fig. 1, and they are pivoted at 34 on the reciprocating member 22.

The device for feeding the saw blade step by step so as to permit the teeth to be successively set and filed, is a lever 35 suitably fulcrumed on the bed 1 and arranged with one end engaging the periphery of the disk 13 on which latter is a cam 36 for periodically actuating the lever, there being a spring 37 connected with the lever and some fixed part of the machine for holding the lever in engagement with the disk 13. The opposite end of the lever is provided with a lip 38, as shown in Fig. 2, which engages the teeth successively and moves the saw blade upwardly with a step by step movement the distance of one tooth at a time, the operation of the feeding device being timed to take place simultaneously with the releasing of the clamping jaws 9.

As the driving shaft 5 rotates, the member 22 is reciprocated so as to rock the saw setter 25 through the agency of the dogs 33, the saw setter being moved first in one direction for setting one tooth and then in the opposite direction for setting another tooth, it being understood that the saw blade is moved one step by the feeding device after each tooth is set so as to bring the succeeding tooth into coöperative relation with the setter. Should it be desired to give only a slight set to the teeth, the dogs 33 may be thrown outwardly to the dotted line position shown in Fig. 1, so as to cause the setter 25 to be oscillated by the end walls of the slot 30, Fig. 3, coming into engagement with the setter and thereby impart a comparatively slight rocking movement to the latter.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:—

1. In a machine of the class described, the combination of a saw blade feeding device, an oscillatory member provided with a slot for receiving the saw teeth, a slotted member into which one extremity of the first member extends for actuating the latter, and dogs carried by the second member for releasably engaging said extremity.

2. In a machine of the class described, the combination of a reciprocatory actuator having spaced abutments, an oscillatory saw-setting member disposed between the abutments and alternately engaged thereby for producing the minimum set of teeth of the saw, and dogs carried by the actuator and adapted to be thrown into or out of engagement with the member for producing a greater set of the teeth.

3. In a machine of the class described, the combination of an oscillatory saw-setting member having a slot for receiving the teeth of a saw, a reciprocatory actuator provided with spaced abutments between which one extremity of the member extends and constituting a lost motion connection between the actuator and member, and pivoted dogs on the actuator and coöperating with the member for reducing the lost motion and thereby increasing the set of the teeth.

4. In a machine of the class described, the combination of an oscillatory saw setter comprising a member having spaced jaws at one end for engaging the teeth of the saw blade, a reciprocatory actuator provided with a slot into which the opposite end of the member projects, and oppositely disposed dogs on the actuator adapted to be adjusted into or out of engagement with the said member.

In testimony whereof, I affix my signature in presence of two witnesses.

SIDNEY E. ARNEY.

Witnesses:
ALONZO H. ELLIS,
G. E. CAVIN.